United States Patent
Lee et al.

(10) Patent No.: US 9,173,223 B2
(45) Date of Patent: Oct. 27, 2015

(54) METHOD OF TRANSFERRING DATA IN A WIRELESS COMMUNICATION SYSTEM

(75) Inventors: Young Dae Lee, Anyang-si (KR); Sung Jun Park, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1535 days.

(21) Appl. No.: 12/312,979

(22) PCT Filed: Dec. 7, 2007

(86) PCT No.: PCT/KR2007/006359
§ 371 (c)(1),
(2), (4) Date: Oct. 19, 2009

(87) PCT Pub. No.: WO2008/069616
PCT Pub. Date: Jun. 12, 2008

(65) Prior Publication Data
US 2010/0034153 A1   Feb. 11, 2010

Related U.S. Application Data

(60) Provisional application No. 60/869,073, filed on Dec. 7, 2006, provisional application No. 60/884,401, filed on Jan. 10, 2007.

(30) Foreign Application Priority Data

Jan. 10, 2007   (KR) .......................... 10-2007-0002807

(51) Int. Cl.
*H04W 72/10* (2009.01)
*H04W 76/04* (2009.01)

(52) U.S. Cl.
CPC .............. *H04W 72/10* (2013.01); *H04W 76/04* (2013.01)

(58) Field of Classification Search
CPC ...................................................... H04W 72/10
USPC ........................................................ 370/329
See application file for complete search history.

(56) References Cited

U.S. PATENT DOCUMENTS 6,374,115 B1   4/2002  Barnes et al.
6,421,359 B1 * 7/2002  Bennett et al. ................ 370/538
(Continued)

FOREIGN PATENT DOCUMENTS

CN   1518236   8/2004
CN   1595362   3/2005
(Continued)

OTHER PUBLICATIONS

"Universal Mobile Telecommunications System (UMTS); User Equipment (UE) procedures in idle mode and procedures for cell reselection in connected mode (3GPP TS 25.304 version 7.1.0 Release 7); ETSI TS 125 304", ETSI Standards, Dec. 2006, XP014039981.

(Continued)

*Primary Examiner* — Luat Phung
*Assistant Examiner* — Saad A Waqas
(74) *Attorney, Agent, or Firm* — Dentons US LLP

(57) ABSTRACT

A method of transferring data in a wireless communication system is disclosed. A method of transferring data in a transmitting side of a wireless communication system includes checking whether at least one priority change condition is satisfied, changing a previously set priority of a plurality of upper layer channels if the at least one priority change condition is satisfied, and allocating radio resources of a lower layer channel to data of each of the plurality of upper layer channels in accordance with the changed priority.

3 Claims, 12 Drawing Sheets

(56) References Cited

U.S. PATENT DOCUMENTS

| | | | |
|---|---|---|---|
| 6,470,391 B2 | 10/2002 | Takamoto et al. | |
| 6,665,313 B1 | 12/2003 | Chang et al. | |
| 6,697,347 B2 | 2/2004 | Ostman et al. | |
| 6,778,501 B1 | 8/2004 | Malmgren et al. | |
| 7,054,288 B2 | 5/2006 | Sternberg et al. | |
| 7,158,504 B2 | 1/2007 | Kadaba et al. | |
| 7,295,573 B2 | 11/2007 | Yi et al. | |
| 7,359,924 B2 | 4/2008 | Balachandran et al. | |
| 7,542,457 B2 | 6/2009 | Wu | |
| 7,590,181 B2 | 9/2009 | Awad et al. | |
| 7,593,694 B2 | 9/2009 | Michel et al. | |
| 7,606,154 B1 * | 10/2009 | Lee | 370/232 |
| 7,623,483 B2 | 11/2009 | Yi et al. | |
| 7,639,644 B2 | 12/2009 | Sternberg et al. | |
| 7,646,742 B2 | 1/2010 | Petrovic et al. | |
| 7,650,559 B2 | 1/2010 | Nishibayashi et al. | |
| 7,743,310 B2 | 6/2010 | Nishibayashi et al. | |
| 7,764,661 B2 | 7/2010 | Heo et al. | |
| 7,801,563 B2 | 9/2010 | Hara et al. | |
| 7,844,884 B2 | 11/2010 | Roh et al. | |
| 7,848,279 B2 | 12/2010 | Ranta-aho et al. | |
| 7,894,390 B2 | 2/2011 | Nakamata et al. | |
| 7,912,471 B2 | 3/2011 | Kondikara Patabandi et al. | |
| 8,054,786 B2 | 11/2011 | Wu et al. | |
| 8,054,788 B2 | 11/2011 | Ma et al. | |
| 8,059,681 B2 | 11/2011 | Kim et al. | |
| 8,090,390 B2 | 1/2012 | Lee et al. | |
| 8,179,836 B2 * | 5/2012 | Terry et al. | 370/328 |
| 8,208,492 B2 | 6/2012 | Kim et al. | |
| 8,259,687 B2 * | 9/2012 | Foore et al. | 370/335 |
| 2001/0055972 A1 * | 12/2001 | Sakata | 455/452 |
| 2002/0016178 A1 * | 2/2002 | Kito | 455/522 |
| 2002/0167961 A1 * | 11/2002 | Haartsen | 370/444 |
| 2002/0170013 A1 | 11/2002 | Bolourchi et al. | |
| 2002/0174276 A1 | 11/2002 | Jiang | |
| 2002/0191641 A1 * | 12/2002 | Lhermitte et al. | 370/468 |
| 2003/0039230 A1 | 2/2003 | Ostman | |
| 2003/0040314 A1 | 2/2003 | Hogan et al. | |
| 2003/0095519 A1 | 5/2003 | Kuo et al. | |
| 2003/0152083 A1 | 8/2003 | Nagata et al. | |
| 2003/0157953 A1 | 8/2003 | Das et al. | |
| 2003/0181221 A1 | 9/2003 | Nguyen | |
| 2003/0207696 A1 | 11/2003 | Willenegger et al. | |
| 2003/0210669 A1 | 11/2003 | Vayanos et al. | |
| 2003/0214935 A1 | 11/2003 | Khan et al. | |
| 2003/0231612 A1 | 12/2003 | Kim et al. | |
| 2004/0103435 A1 | 5/2004 | Yi et al. | |
| 2004/0162071 A1 | 8/2004 | Grilli et al. | |
| 2004/0228294 A1 | 11/2004 | Kim et al. | |
| 2004/0266461 A1 | 12/2004 | Beckmann et al. | |
| 2005/0039101 A1 | 2/2005 | Torsner | |
| 2005/0058078 A1 | 3/2005 | Jung et al. | |
| 2005/0083943 A1 | 4/2005 | Lee et al. | |
| 2005/0111487 A1 | 5/2005 | Matta et al. | |
| 2005/0207343 A1 | 9/2005 | Han | |
| 2005/0220116 A1 | 10/2005 | Ahn et al. | |
| 2005/0237960 A1 | 10/2005 | Kim | |
| 2005/0250506 A1 | 11/2005 | Beale et al. | |
| 2006/0003733 A1 * | 1/2006 | Chun et al. | 455/403 |
| 2006/0018294 A1 | 1/2006 | Kynaslahti et al. | |
| 2006/0067238 A1 | 3/2006 | Olsson et al. | |
| 2006/0092911 A1 | 5/2006 | Hwang et al. | |
| 2006/0092973 A1 | 5/2006 | Petrovic et al. | |
| 2006/0114877 A1 | 6/2006 | Heo et al. | |
| 2006/0140158 A1 | 6/2006 | Terry | |
| 2006/0146833 A1 * | 7/2006 | Roberts et al. | 370/395.42 |
| 2006/0148411 A1 | 7/2006 | Cho et al. | |
| 2006/0153237 A1 | 7/2006 | Hwang et al. | |
| 2006/0176856 A1 | 8/2006 | Yang et al. | |
| 2006/0183429 A1 | 8/2006 | Anderson | |
| 2006/0203760 A1 | 9/2006 | Fukui et al. | |
| 2006/0245386 A1 | 11/2006 | Hu | |
| 2006/0251019 A1 | 11/2006 | Dalsgaard et al. | |
| 2006/0251105 A1 | 11/2006 | Kim et al. | |
| 2006/0268919 A1 | 11/2006 | Malladi et al. | |
| 2007/0014229 A1 | 1/2007 | Hepler et al. | |
| 2007/0047452 A1 | 3/2007 | Lohr et al. | |
| 2007/0064602 A1 | 3/2007 | Jiang | |
| 2007/0091810 A1 | 4/2007 | Kim et al. | |
| 2007/0180119 A1 * | 8/2007 | Khivesara et al. | 709/226 |
| 2007/0254679 A1 | 11/2007 | Montojo et al. | |
| 2007/0293222 A1 | 12/2007 | Vikberg et al. | |
| 2008/0045272 A1 | 2/2008 | Wang et al. | |
| 2008/0056148 A1 | 3/2008 | Wu | |
| 2008/0056183 A1 | 3/2008 | Gorokhov et al. | |
| 2008/0084844 A1 | 4/2008 | Reznik et al. | |
| 2008/0101270 A1 | 5/2008 | Kekki et al. | |
| 2008/0101280 A1 | 5/2008 | Gholmieh et al. | |
| 2008/0117891 A1 | 5/2008 | Damnjanovic et al. | |
| 2008/0165724 A1 | 7/2008 | Wu et al. | |
| 2008/0165755 A1 | 7/2008 | Marinier et al. | |
| 2008/0273610 A1 | 11/2008 | Malladi et al. | |
| 2009/0016275 A1 | 1/2009 | Liu et al. | |
| 2009/0028123 A1 | 1/2009 | Terry et al. | |
| 2009/0088185 A1 | 4/2009 | Beale | |
| 2009/0143072 A1 | 6/2009 | Montojo et al. | |
| 2009/0221293 A1 | 9/2009 | Petrovic et al. | |
| 2009/0268676 A1 | 10/2009 | Wigard et al. | |
| 2010/0034139 A1 | 2/2010 | Love et al. | |
| 2010/0091721 A1 | 4/2010 | Larmo et al. | |
| 2010/0208667 A1 | 8/2010 | Chun et al. | |
| 2011/0190001 A1 | 8/2011 | Kondikara Patabandi et al. | |

FOREIGN PATENT DOCUMENTS

| | | |
|---|---|---|
| CN | 1613210 | 5/2005 |
| CN | 1735089 | 2/2006 |
| CN | 1805594 A | 7/2006 |
| CN | 1805596 | 7/2006 |
| EP | 1168759 | 1/2002 |
| EP | 1351538 | 10/2003 |
| EP | 1 432 261 | 6/2004 |
| EP | 1418717 A1 | 12/2004 |
| EP | 1553798 | 7/2005 |
| EP | 1708524 A1 | 4/2006 |
| EP | 1 724 948 | 11/2006 |
| EP | 1720322 | 11/2006 |
| EP | 1748593 A1 | 1/2007 |
| EP | 1 755 355 | 2/2007 |
| EP | 1 843 504 | 10/2007 |
| EP | 1 845 649 | 10/2007 |
| EP | 1 845 650 | 10/2007 |
| JP | 2001-078272 | 3/2001 |
| JP | 2002-247042 | 8/2002 |
| JP | 2002-527945 | 8/2002 |
| JP | 2002-290413 | 10/2002 |
| JP | 2003-304574 | 10/2003 |
| JP | 2005-160079 | 6/2005 |
| JP | 2005-525065 | 8/2005 |
| JP | 2006-121282 | 5/2006 |
| JP | 2006-121394 | 5/2006 |
| JP | 2006-148490 | 6/2006 |
| JP | 2006-237897 | 9/2006 |
| JP | 2006-524444 | 10/2006 |
| JP | 2006-311411 A | 11/2006 |
| JP | 2006-524969 | 11/2006 |
| JP | 2006325264 A | 11/2006 |
| JP | 2006-352708 | 12/2006 |
| JP | 2009-535957 | 10/2009 |
| KR | 1020020000649 A | 1/2002 |
| KR | 10-2002-0014939 | 2/2002 |
| KR | 10-2002-0061512 | 7/2002 |
| KR | 10-0365356 B1 | 12/2002 |
| KR | 10-2003-0049176 | 6/2003 |
| KR | 1020050073237 A | 7/2005 |
| KR | 20-0391476 A | 8/2005 |
| KR | 10-2005-0118591 | 12/2005 |
| KR | 10-2006-0036120 A | 4/2006 |
| KR | 10-2006-0115037 A | 8/2006 |
| KR | 1020060087355 A | 8/2006 |
| KR | 1020060090134 A | 8/2006 |
| KR | 1020060109799 A | 10/2006 |
| KR | 10-2006-0115175 | 11/2006 |
| KR | 10-2007-0000412 A | 1/2007 |

(56) References Cited

FOREIGN PATENT DOCUMENTS

| | | |
|---|---|---|
| RU | 2004-132193 | 4/2005 |
| RU | 2005-116242 A | 11/2005 |
| RU | 2004-126160 | 1/2006 |
| RU | 2428819 | 9/2011 |
| TW | 1256215 B | 6/2006 |
| WO | WO 97/11566 | 3/1997 |
| WO | WO 98/24250 | 6/1998 |
| WO | WO0021253 | 4/2000 |
| WO | WO 02/093296 | 11/2002 |
| WO | WO 03/084095 A1 | 10/2003 |
| WO | WO 03/085874 | 10/2003 |
| WO | WO 03/096567 | 11/2003 |
| WO | WO 2004/017541 A1 | 2/2004 |
| WO | 2004028041 A1 | 4/2004 |
| WO | WO 2005/015801 | 2/2005 |
| WO | WO 2005/048613 A1 | 5/2005 |
| WO | 2005096522 A1 | 10/2005 |
| WO | WO 2005/125252 | 12/2005 |
| WO | WO 2006/022876 | 3/2006 |
| WO | WO2006083149 | 8/2006 |
| WO | WO 2006/105333 | 10/2006 |
| WO | WO 2006/118418 | 11/2006 |
| WO | 2007/002202 A2 | 1/2007 |
| WO | WO 2007/068304 | 6/2007 |
| WO | WO2007125428 | 11/2007 |

OTHER PUBLICATIONS

"Universal Mobile Telecommunications System (UMTS); High Speed Downlink Packet Access (HSDPA); Overall description; Stage 2 (3GPP TS 25.308 version 7.1.0 Release 7); ETSI TS 125 308", ETSI Standards, LIS, Dec. 2006, XP014039997.
R2-061189: Further discussion on delay enhancements in Re17 3GPP Nokia, TSG-RAN WG2 Meeting #53, Shanghai, China, May 8-12, 2006.
Samsung: "DL Control Channel Structure: Overview", 3GPP TSG-RAN WG1, R1-062534, Oct. 9, 2006, sections 1-4.
Ericsson: "E_UTRA Downlink Control Signaling—Open Issues", 3GPP TSG-RAN WG1, R!-061365, May 8, 2006, section 2.
Rapporteur (Motorola): "Report of E-Mail Discussion: DL Scheduling", 3GPP TSG-RAN WG1, R1-063684, Dec. 12, 2006, section 2, annex C.
LG Electronic: "Downlink control signaling", 3GPP TSG_RAN WG!, R1-063177, Nov. 6, 2006, sections 1-2.
Texas Instruments: "Control Channel Structure and Coding in E-UTRA Downlink", 3GPP TSG-RAN WG1, R1-063220, Nov. 6, 2006, sections 1-5.
Sharp: "UE Identity in L1/L2 Control Signaling for Downlink Scheduling Resource Allocation", 3GPP TSG-RAN WG2, R2-061129, May 8, 2006, sections 1-3.
Nokia: "ARQ Operation with HARQ-ARQ Interaction", 3GPP TSG-RAN WG2, R2-062765, Oct. 9, 2006, sections 2-3.
Ericsson: "Uplink HARQ-ARQ Interactions for NACK -> ACK Error", 3GP TSG-RAN WG2, R2-063238, Nov. 6, 2006, fig. 1, p. 2.
Samsung:"MAC functions: ARQ", 3GP TSG-RAN WG2, R2-060374, Feb. 13, 2006, section 2.
Herrmann, C. et al., "Improving Packet Loss Probability in the UMTS High-Speed Downlink", IEEE Vehicular Technology Conference, VTC Fall 2003, Oct. 6, 2003, pp. 2655-2659.
$3^{rd}$ Generation Partnership Project: Technical Specification Group Radio Access Network, Physical Layers Aspects for Evolved UTRA (Release 7), 3GPP TR 25.814, v1.5.0, May 2006.
Siemens AG: "TDD: Measurement and Reporting Concept for 25.331", 3GPP Draft; R2-99B55, 3rd Generation Partnership Project (3GPP), XP050113684, Sep. 30, 1999.
Samsung: "DL control channel structure: overview", 3GPP DRAF; R1-063272, 3rd Generation Partnership Project (3GPP), XP050103722, Nov. 1, 2006.
3GPP Draft; R2-062440 Enhance_Cell_fach_R2, 3rd Generation Partnership Project (3GPP), Mobile Competence Centre; XP050132021, Aug. 24, 2006.
Antti Toskala et al: "chapter 11 High-speed downlink packet access", WCDMA for UMTS; Radio Access for Third Generation Mobilecommunications, XP002458223, Jan. 1, 2002.
"Scheduling of System Information", R2-070220, 3rd Generation Partnership Project (3GPP), XP050133321, Jan. 12, 2007.
Nokia (Rapporteure): "System Information Classification", 3GPP Draft; R2-063077 SI Classification, 3rd Generation Partnership Project (3GPP), XP050132586, Nov. 1, 2006.
Qualcomm Europe: "Design and Performance of BCH for U-UTRA", 3GPP Draft; R1-062688, 3rd Generation Partnership Project (3GPP), XP050103177, Oct. 4, 2006.
"3rd Generation Partnership Project; Technical Specification Group Radio Access Network; Radio Link Control (RLC) protocol specification (Release 7)", 3GPP Standard; 3GPP TS 25.322, XP050367794, Sep. 1, 2006, pp. 1-80.
Pietro Nicoletti: "IEEE 802.11 frame format", XP055083596, Jun. 1, 2005.
Torres D: "Wireless Services R-Evolution: A Practical Overview of HSDPA", XP001504561, Jul. 1, 2005, pp. 161-167.
Ericsson: "Semi persistent scheduling", 3GPP Draft; R2-062859, 3rd Generation Partnership Project (3GPP), XP050132382, Oct. 5, 2006.
LG Electronics, "LTE System Information", TSG-RAN Working Group 2 #53, R2-061476, May 4, 2006.
3GPP TR 25.813 V7.1.0, 3rd Generation Partnership project; Technical Specification Group Radio Access Network Evolved Universal Terrestrial Radio Access (E-UTRA) and Evolved Universal Terrestrial Radio Access Network (E-UTRA) Radio interface protocol aspects (Release 7), Oct. 18, 2006.
Ericsson: "Enhanced Cell_Fach", 3GPP Draft; R2-063209, 3rd Generation Partnership Project (3GPP), vol. RAN WG2, Nov. 1, 2006.

* cited by examiner (A)

(B)

(C)

METHOD OF TRANSFERRING DATA IN A WIRELESS COMMUNICATION SYSTEM

This application claims priority to PCT/KR2007/006360 filed on Dec. 7, 2007, U.S. Provisional Application No. 60/869,073 filed Dec. 7, 2006, U.S. Provisional No. 60/884,401 filed Jan. 10, 2007, and Korean Patent Application No. 10-2007-0002807 filed on Jan. 10, 2007, all of which are hereby incorporated by reference in their entirety.

TECHNICAL FIELD

The present invention relates to a wireless communication system, and more particularly, to a method of transferring data in a wireless communication system.

BACKGROUND ART

Recently, there is an increasing necessity of multimedia services, such as e-mail service, image communication service, and Internet service, as well as voice communication service, which are provided through a wireless communication system. In this respect, it is general that a plurality of services are simultaneously transmitted through a downlink channel or an uplink channel.

When transmitting a plurality of services by multiplexing them, it is important how many radio resources are allocated in accordance with which basis so as to transmit each service. In general, priority of each service is determined depending on service types, billing system, etc., and radio resources are allocated depending on the determined priority.

The method for allocating radio resources depending on priority has a problem in that quality of service (QoS) may be disregarded. For example, when a plurality of services having different priorities are transmitted, if data of a service having high priority occur continuously, radio resources will continuously be allocated to the service having high priority depending on priority. In this case, a problem occurs in that radio resources are not allocated to a service having low priority for a long time, whereby service quality required for the corresponding service within the minimum range may not be obtained.

As described above, the status where data of a service cannot be transmitted due to transmission of another service having higher priority is called 'starvation.' The starvation acts to remarkably deteriorate service quality of a specific service. For example, in case of a real time service such as audio streaming, data should be transmitted continuously at a given quantity. However, if starvation occurs due to priority, packets which have not been transmitted for a long time are not required any longer and thus are discarded. As a result, a problem occurs in that service quality is deteriorated.

DISCLOSURE OF THE INVENTION

Accordingly, the present invention is directed to a method of transferring data in a wireless communication system, which substantially obviates one or more problems due to limitations and disadvantages of the related art.

An object of the present invention is to provide a method of transferring data in a wireless communication system, in which radio resources can be distributed efficiently to each of a plurality of services provided by the wireless communication system.

To achieve these objects and other advantages and in accordance with the purpose of the invention, as embodied and broadly described herein, a method of transferring data in a transmitting side of a wireless communication system comprises checking whether at least one priority change condition is satisfied, changing a previously set priority of a plurality of upper layer channels if the at least one priority change condition is satisfied, and allocating radio resources of a lower layer channel to data of each of the plurality of upper layer channels in accordance with the changed priority.

In another aspect of the present invention, a method of transferring data in a transmitting side of a wireless communication system to multiplex a plurality of upper layer channels and map the multiplexed upper layer channels with a lower layer channel comprises changing a previously set priority of the plurality of upper layer channels if at least one priority change condition is satisfied, selecting a specific transport format combination (TFC) from a specific transport format combination set (TFCS) in accordance with the changed priority, and transferring data of each of the plurality of the upper layer channels to the lower layer in accordance with the selected TFC.

In still another aspect of the present invention, a method of transferring data in a transmitting side of a wireless communication system to multiplex data of a plurality of services and map the multiplexed data with a lower layer channel comprises checking whether at least one priority change condition is satisfied, changing a previously set priority of the plurality of services if the at least one priority change condition is satisfied, and allocating radio resources of the lower layer channel to data of each of the plurality of services in accordance with the changed priority.

In further still another aspect of the present invention, a method of transferring data in a transmitting side of a wireless communication system comprises checking whether at least one condition, which is previously set, is satisfied, allocating radio resources of a lower layer channel to predetermined data of each of a plurality of upper layer channels if the at least one condition is satisfied, and allocating the radio resources of the lower layer channel to data of each of the plurality of upper layer channels in accordance with a priority which is previously set, if there is redundancy in the radio resources of the lower layer channel.

In further still another aspect of the present invention, a user equipment for a wireless communication is set to perform the steps of changing a previously set priority of a plurality of upper layer channels if at least one priority change condition is satisfied, selecting a specific transport format combination (TFC) from a specific transport format combination set (TFCS) in accordance with the changed priority, and transferring data of each upper layer channel to a lower layer in accordance with the selected TFC.

The at least one condition includes a condition as to whether the quantity of data stored in a buffer of an upper layer channel exceeds a predetermined threshold value. In this case, the priority of the upper layer channel is increased if the quantity of data stored in the buffer of the upper layer channel exceeds the predetermined threshold value.

The at least one condition includes a condition as to whether an average waiting time of data stored in a buffer of an upper layer channel exceeds a predetermined reference value. In this case, the priority of the upper layer channel is increased if the average waiting time of data stored in the buffer of the upper layer channel exceeds the predetermined reference value.

BRIEF DESCRIPTION OF THE DRAWINGS

FIG. 3A and FIG. 3B illustrate a structure of a radio interface protocol between a user equipment (UE) and E-UTRAN, in which FIG. 3A is a schematic view of a control plane protocol and FIG. 3B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to E-UMTS (Evolved Universal Mobile Telecommunications System).

Figure 1:
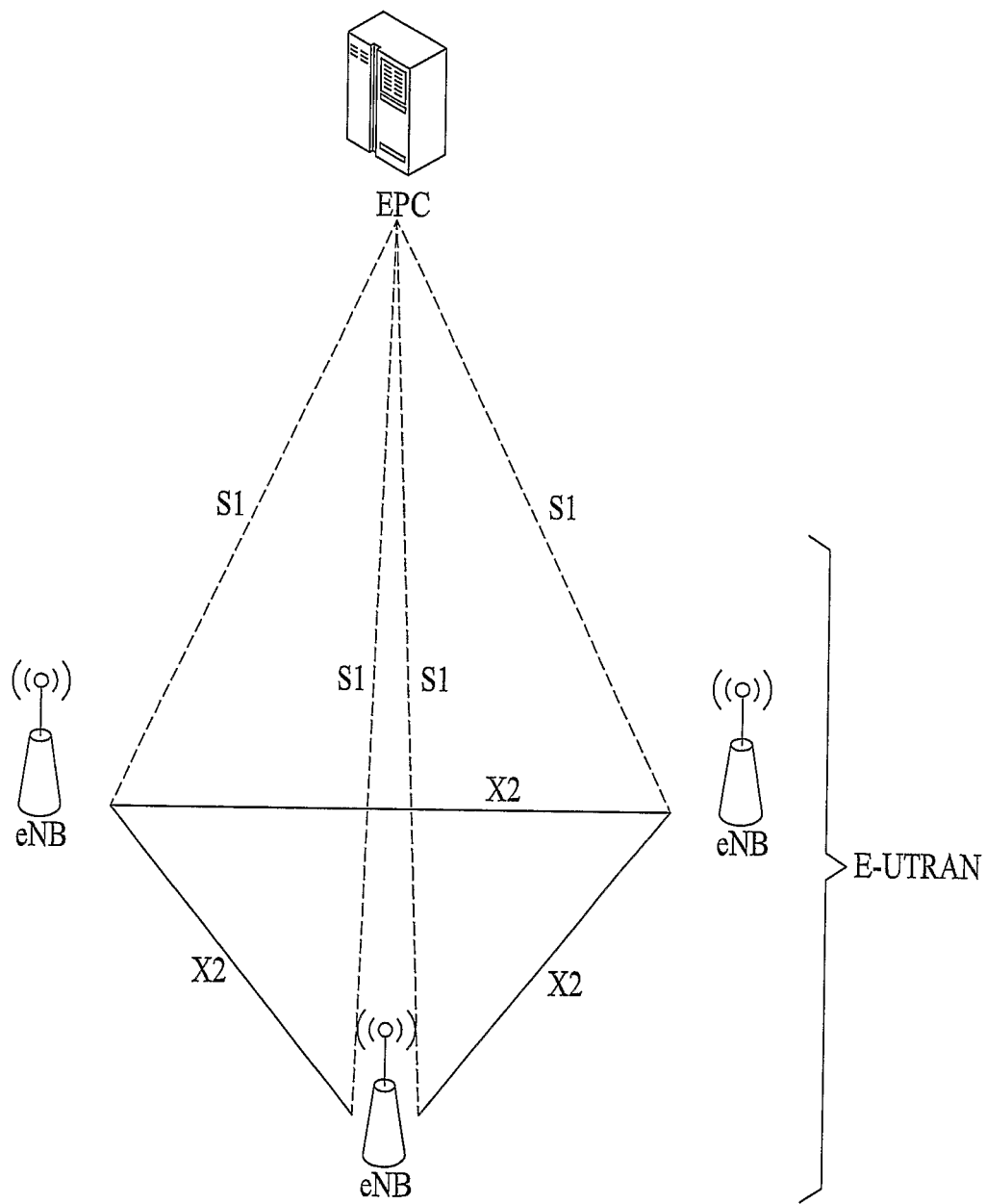
FIG. 1 illustrates a network structure of an E-UMTS (Evolved-Universal Mobile Telecommunications System)

FIG. 1 illustrates a network structure of an E-UMTS. An E-UMTS is a system evolving from the conventional WCDMA UMTS and its basic standardization is currently handled by the 3 GPP ($3^{rd}$ Generation Partnership Project). The E-UMTS can also be called an LTE (Long Term Evolution) system. [http://www.3gpp.org/ftp/Specs/2006-12/] and [http://www.3gpp.org/ftp/Specs/html-info/GanttChart-Level-2.htm] can be referred to obtain detailed information about the UMTS and E-UMTS.

Referring to FIG. 1, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes MME (Mobility Management Entity)/SAE (System Architecture Evolution) gateway.

Layers of a radio interface protocol between a user equipment and a network can be classified into a first layer L1, a second layer L2 and a third layer L3 based on three lower layers of OSI (Open System Interconnection) standard model widely known in communication systems. A physical layer belonging to the first layer L1 provides an information transfer service using a physical channel. A radio resource control (hereinafter, abbreviated as 'RRC') layer located at the third layer plays a role in controlling radio resources between the user equipment and the network. For this, the RRC layer enables RRC messages to be exchanged between the UE and the network. The RRC layer can be distributively located at network nodes including Node B, and AG and the like or can be independently located at either the Node B or the AG.

Figure 2:
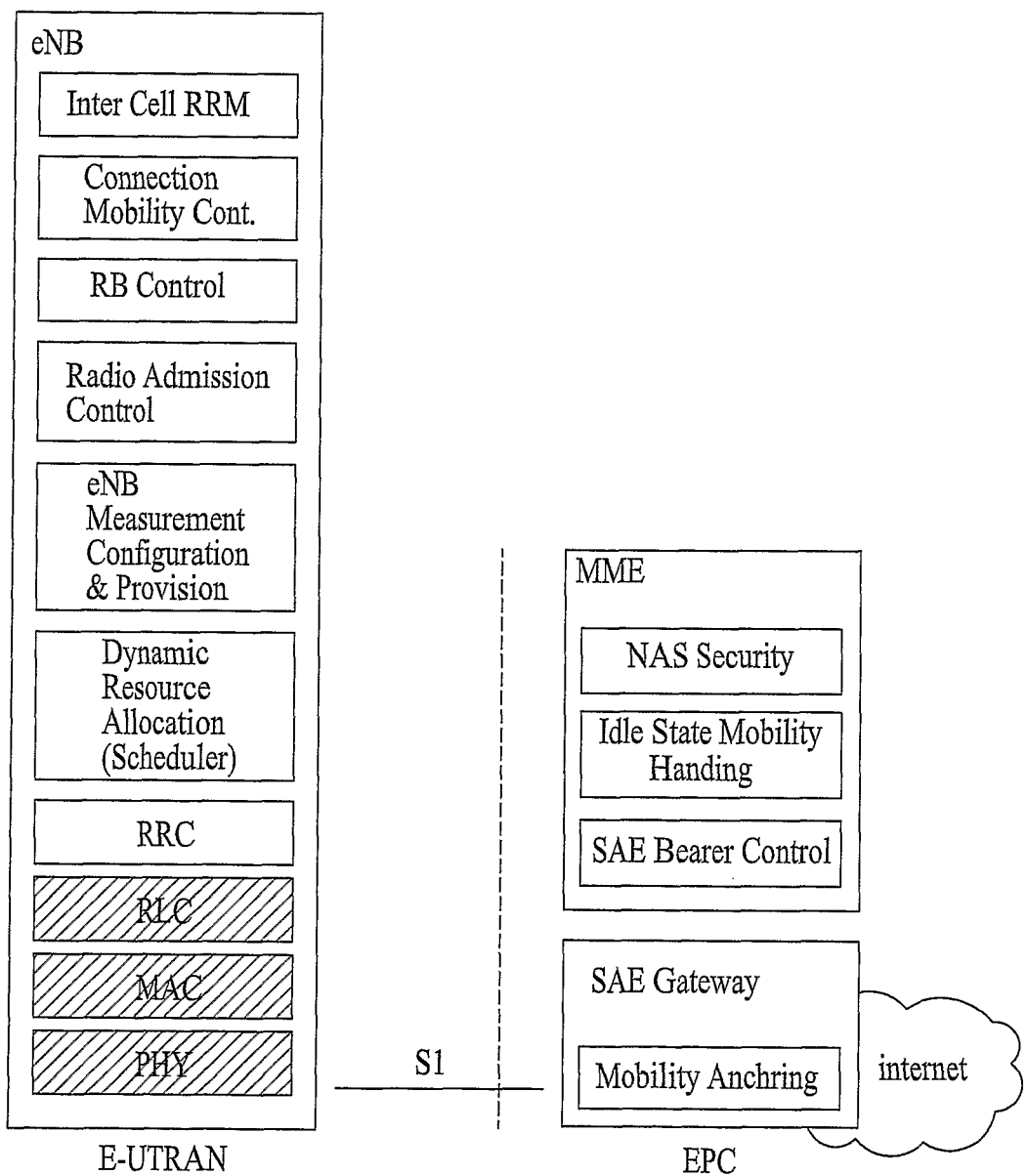
FIG. 2 is a schematic view illustrating an E-UTRAN (Evolved Universal Terrestrial Radio Access Network)

FIG. 2 is a schematic view illustrating an E-UTRAN (UMTS terrestrial radio access network). In FIG. 2, a hatching part represents functional entities of a user plane and a non-hatching part represents functional entities of a control plane.

Figure 3A:
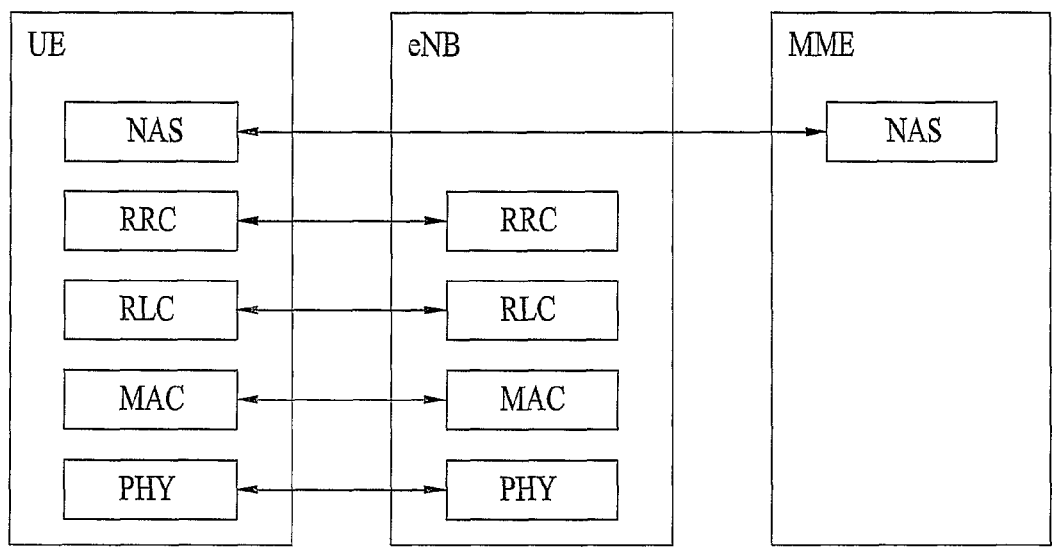
Figure 3B:
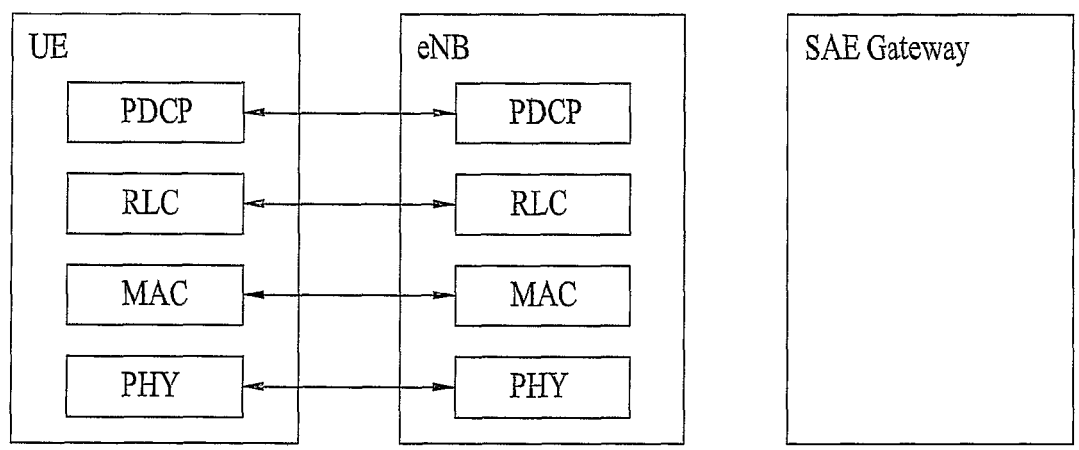

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol vertically includes a physical layer, a data link layer, and a network layer and horizontally includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated according to an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4 or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the user equipment and the UTRAN.

As downlink transport channels carrying data from the network to user equipments, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from user equipments to the network, there are provided a random access channel (RACH) carrying an initial control message and an uplink shared channel (UL-SCH) carrying user traffic or control message.

As logical channels located above the transport channels and mapped with the transport channels, there are provided a broadcast channel (BCCH), a paging control channel (PCCH), a common control channel (CCCH), a multicast control channel (MCCH), and a multicast traffic channel (MTCH).

Hereinafter, selection of a transport format combination (TFC), which is performed in the MAC layer of the UMTS, will be described.

The TFC selection serves to select transport blocks of a proper size and the number of transport blocks to be suitable for a wireless channel status which is instantaneously variable. The TFC selection enables limited radio resources to be efficiently used within the limits of the possible. The MAC layer basically transmits transport blocks to the PHY layer through transport channels. A transmission block set (TBS) means a set of transport blocks simultaneously transmitted through the same transport channel. In other words, the transmission block set may be referred to as a set of transport blocks transmitted for a specific transmission time interval (TTI). The TTI means a basic transmission time interval defined in a specific transport channel, and has a value of an integer multiple of 10 ms which is a time unit called a radio frame. A transport block size is a value of a bit unit with respect to the size of a transport block. A value of a bit unit with respect to the size of the transport block set is called a transport block set size. The transport block size transmitted for a specific TTI in the same transport channel is always constant. Accordingly, the transport block set size has a value of an integer multiple of the transport block size for a specific TTI.

A transport format (TF) means configuration information of the transport block set transmitted for a specific TTI from one transport channel. The TF can be classified into dynamic configuration information and semi-static configuration information. The dynamic configuration information includes transport block size and transport block set size information. The semi-static configuration information includes information such as TTI, error correction code, coding rate, rate matching parameter, and CRC size. A transport format set (TFS) means a set of TFs related to a specific transport channel. The semi-static parts of all TFs within the same TFS are equal to one another. Since a transport speed can be determined by the dynamic part of the TF, it is possible to support various transport speeds by changing the transport block size and the transport block set size.

When determining TF of a specific transport channel, the MAC layer should consider transport channel multiplexing in the PHY layer. The transport channel multiplexing means that a plurality of transport channels are mapped with one coded composite transport channel (CCTrCH). Although the transport channel multiplexing is performed in the PHY layer, the MAC layer should consider all transport channels mapped with the same CCTrCH when TF is determined. Since the quantity of data actually processed in the PHY layer is transmitted through the CCTrCH, the MAC layer should determine TF of each transport channel considering the CCTrCH. At this time, combination of TFs will be referred to as a transport format combination (TFC).

The TFC is not determined by the MAC layer, and is selected from one of available TFC Sets (TFCS) indicated by the RRC layer of the UTRAN. In other words, the RRC layer of the UTRAN reports to the MAC layer available TFCS with respect to one CCTrCH during initial establishment of RB, while the MAC layer selects a proper TFC within the TFCS per TTI. The RRC layer of the user equipment receives TFCS information from the RRC layer of the UTRAN in a wireless mode and reports the TFCS information to the MAC layer of the user equipment.

Selecting a proper TFC per TTI within the given TFCS is performed by the MAC layer. To this end, the MAC layer configures a valid TFCS within the TFCS allocated to the CCTrCH and then selects the most suitable TFC within the configured valid TFCS. The valid TFCS means a set of TFCs, which can actually be used in a corresponding TTI, among the given TFCS. This valid TFCS is called because that the wireless channel status is variable instantaneously and thus the maximum transmission power that can be transmitted by the user equipment is variable. In general, since the quantity of data that can be transmitted is proportional to the size of the transmission power, it is to be understood that available TFC is limited by the maximum transmission power.

The most suitable TFC means a TFC that can transmit data as much as possible within the valid TFCS limited by the maximum transmission power. However, the TFC that can transmit more data without limitation is not selected. The most suitable TFC is selected within the valid TFCS based on logical channel priority. Priorities from 1 to 8 (1: highest priority) are set in the logical channels. If a plurality of logical channels are multiplexed into one transport channel and several transport channels are multiplexed into one CCTrCH, the MAC layer can select a TFC that can transmit logical channel data having high priority at the largest quantity.

Figure 4:
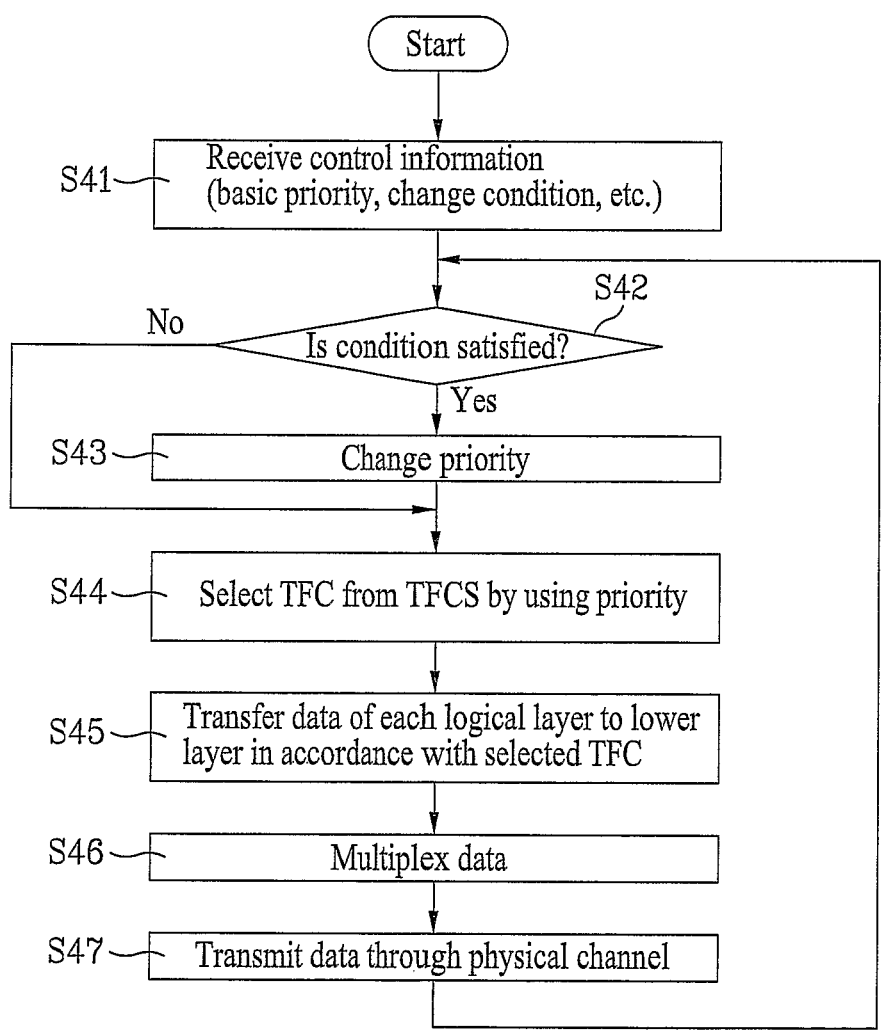
FIG. 4 is a flow chart according to one embodiment of the present invention.

FIG. 4 is a flow chart according to one embodiment of the present invention. The embodiment of FIG. 4 relates to a data processing method for multiplexing data related to a plurality of services in a user equipment of UMTS or E-UMTS and transmitting the multiplexed data to a network.

Referring to FIG. 4, the user equipment receives control information related to priority of logical channels from the network (UTRAN or E-UTRAN) [S41]. The control information includes information related to basic priority of a plurality of logical channels, at least one condition for changing the basic priority, a method of changing priority when the condition is satisfied, and duration of the changed priority. Since the user equipment can transmit a plurality of services through a plurality of logical channels, 'priority of logical channels' can be replaced with 'priority of services.' Also, since one radio bearer (RB) can be set for one service, 'priority of logical channels' or 'priority of services' can be replaced with 'priority of radio bearer.' If the network transmits system information to the user equipment, the control information can be included in the system information when it is transmitted. For another example, the control information can be transmitted to the user equipment during RRC connection establishment between the network and the user equipment, and establishment, change or reestablishment of the radio bearer.

The user equipment checks per TTI whether at least one priority change condition included in the control information is satisfied [S42]. If the condition is satisfied, the user equipment changes the basic priority included in the control information in accordance with the method of changing the priority [S43]. Hereinafter, the steps S41 to S43 of FIG. 4 will be described in detail.

It is supposed that the user equipment transmits RRC service, SIP (Session Initiation Protocol) service, VoIP (Voice of IP) service, BE (Best Effort)1 service, and BE2 service, and the basic priority related to these services is set in the order of RRC, SIP, VoIP, BE1, and BE2. In other words, the priority of the RRC service is the highest and the priority of the BE2 service is the lowest.

As described above, the network notifies the user equipment of at least one condition for changing the priority of the services. An example of the condition for changing the priority includes the quantity of data of each service, which are stored in a transmission buffer (Tx buffer) of the logical channels. In other words, if the quantity of data stored in the transmission buffer per service exceeds a predetermined threshold value, the priority of the corresponding service can be changed to be higher than the current priority.

For example, if the quantity of the data of the BE2 service, which are stored in the transmission buffer of the user equipment, exceeds 50 or satisfies the condition greater than 50, the network can set the BE2 service to have a higher priority than the priority of the BE1 service. In other words, if the quantity of the data of the BE2 service, which are stored in the transmission buffer, exceeds 50, the priority of each service is changed in the order of RRC, SIP, VoIP, BE2, and BE1. The network can also notify the user equipment of specific ways of changing the priority. For example, if the BE2 satisfies the priority change condition, the network notifies the user equipment of the priority of the BE2 service to be changed. For example, if it is set to change the BE2 service to have the third priority, the priority of each service is changed in the order of RRC, SIP, BE2, VoIP, and BE1.

When the priority is changed, the network can notify the user equipment how long the changed priority will be maintained. For example, if the network sets that the user equipment should maintain the changed priority for 1 TTI and the BE2 service satisfies the priority change condition in the Nth TTI, the priority of each service is changed in the Nth TTI from the order of RRC, SIP, VoIP, BE1, and BE2 to the order of RRC, SIP, VoIP, BE2, and BE1. Since the changed priority duration is 1 TTI, the priority of each service is again changed to the basic priority of RRC, SIP, VoIP, BE1, and BE2 in the next (N+1)th TTI.

The service of which priority has been changed once can be set such that its priority cannot be changed even though the change condition of the priority is satisfied for a certain duration. For example, if the BE2 service satisfies the priority change condition in the Nth TTI, the priority of the BE2 is changed in the Nth TTI. If the changed priority duration is 1 TTI, the priority of the corresponding service will be changed again to the original priority in the (N+1)th TTI. Even though the data of the BE2 service still exceeds the threshold value in the (N+1)th TTI, the user equipment may not change the priority of the BE2 service.

For example, it is supposed that the network sets such that the duration for prohibiting the priority from changing again is 5 TTI and the changed priority duration is 1 TTI. In this case, if the BE2 service satisfies the priority change condition in the Nth TTI, the changed priority is in the order of RRC, SIP, VoIP, BE2 and BE1. Since the changed priority duration has passed in the (N+1)th TTI, the priority of each service is changed to the original basic priority of RRC, SIP, VoIP, BE1 and BE2. Even though the BE2 service satisfies the priority change condition from the (N+1)th TTI to the (N+5)th TTI, since it is within 5 TTI which is the duration for prohibiting the priority from changing, the priority of the BE2 service is not changed. This is to prevent the BE service from continuously having higher priority than the original priority when the data of the BE2 service are stored in the transmission buffer at the very large quantity.

The network can set one or more priority change conditions in accordance with each service. For example, if the quantity of the data of the BE2 service exceeds 50, the changed priority duration may be set to 1 TTI and the duration for prohibiting the priority from changing may be set to 5 TTI. If the quantity of the data of the BE2 service exceeds 80, the changed priority duration may be set to 2 TTI and the duration for prohibiting the priority from changing may be set to 4. Also, the priority of the BE2 service may be changed to the fourth priority if the quantity of the data of the BE2 service exceeds 50 while the priority of the BE2 service may be changed to the third priority if the quantity of the data of the BE2 service exceeds 80.

Whether a waiting time of data of each service in the transmission buffer exceeds a predetermined reference value could be another priority change condition. For example, it is supposed that whether the quantity of data stored in the transmission buffer exceeds 50 corresponds to the priority change condition of the BE2 service and that the current quantity of the data of the BE2 service in the transmission buffer is 40 and the data of the BE2 service do not occur any longer. In this case, if the services RRC, SIP, VoIP and BE1, of which priorities are higher than the priority of the BE2 service, have a lot of data, since the BE2 service does not satisfy the priority change condition, 'starvation' may continue to occur. In other words, to cope with this status, the network can set an average waiting time of the data of each service in the transmission buffer to the priority change condition. For example, it is supposed that the network sets whether an average waiting time of the data of the BE2 service in the transmission buffer exceeds 10 TTI to the priority change condition. In this case, the user equipment calculates an average value of a waiting time of the data of the BE2 service in the transmission buffer after the data of the BE2 service are generated. The user equipment changes the priority of the BE2 service by the aforementioned method when the average waiting time exceeds 10 TTI.

Figure 5:
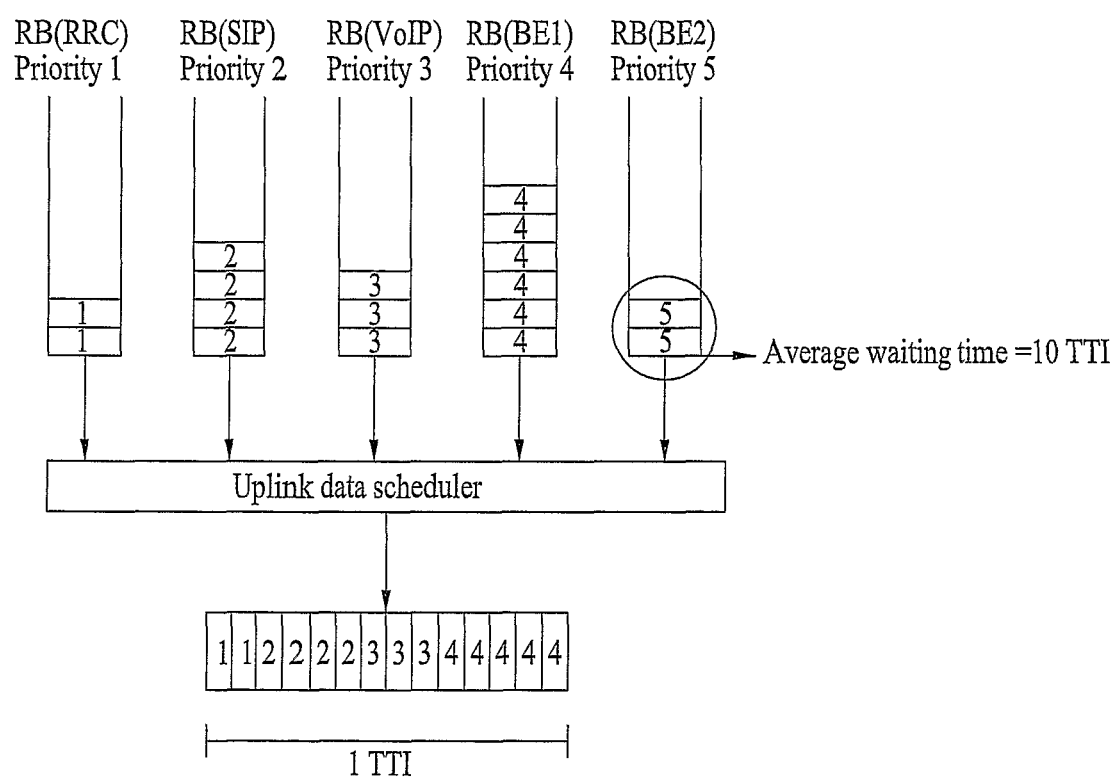
FIG. 5 illustrates a case where priority is changed based on the quantity of data stored in a transmission buffer in accordance with one embodiment of the present invention.

The case where the priority change of each service is set based on the average waiting time of the data in the transmission buffer will be described below. FIG. 5 illustrates the case where the priority is changed based on the quantity of data stored in the transmission buffer in accordance with one embodiment of the present invention. It is supposed that the data of the BE2 service, which are stored in the transmission buffer, do not reach the priority change condition. In this case, even though the data for the BE2 service are delayed in transmission for average 10 TTI, the priority of the BE2 service is not changed, whereby 'starvation' of the BE2 service occurs.

Figure 6:
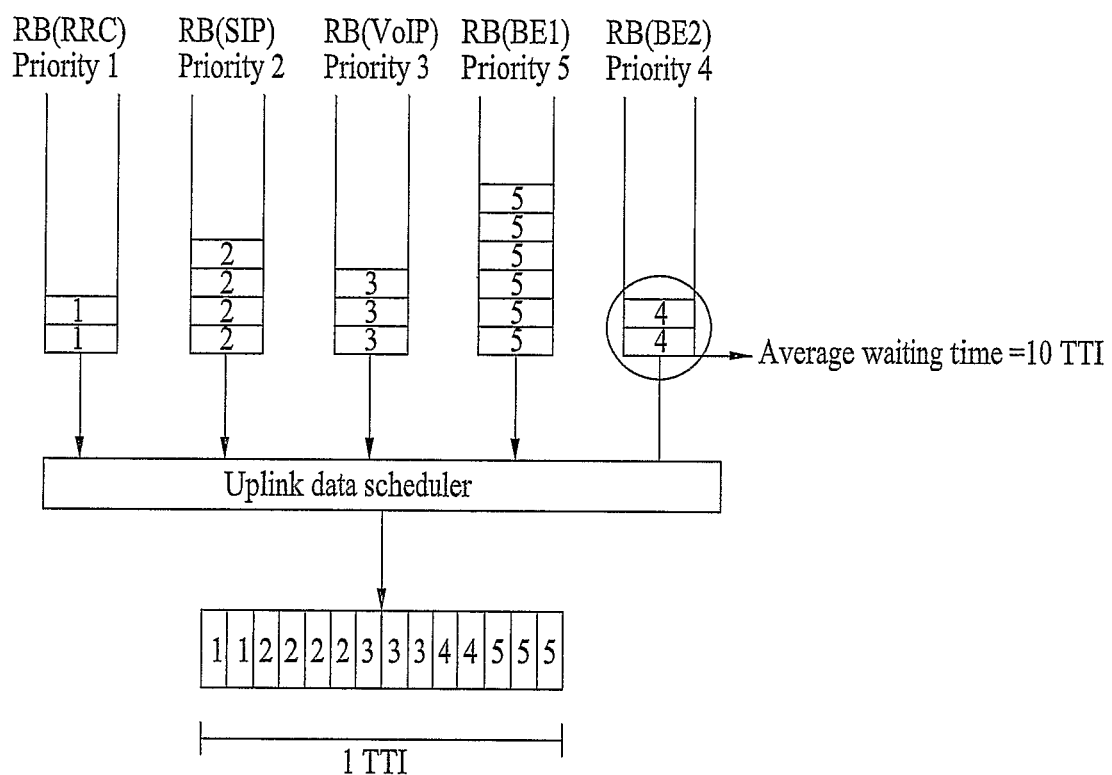
FIG. 6 illustrates a method of changing priority when priority change of each service is performed based on an average waiting time of data in a transmission buffer in accordance with one embodiment of the present invention.

FIG. 6 illustrates a method of changing priority when priority change of each service is performed based on the average waiting time of data in the transmission buffer in accordance with one embodiment of the present invention. It is supposed that a reference value of the average waiting time for the priority change is 10 TTI and the average waiting time of the data of the BE2 service in the transmission buffer is 10 TTI. In this case, the priority of each service is changed in the order of RRC, SIP, VoIP, BE2 and BE1, and the data of the BE2 service are processed more previously than the data of the BE1 service. In other words, the method of setting the priority change condition to the average waiting time is to prevent 'starvation' from occurring as the priority is not changed due to the small quantity of the data when the quantity of the data in the transmission buffer is set to the priority change condition.

There may be one or more priority change conditions for each service. For example, if data of a specific service are stored in the transmission buffer at a certain quantity, the priority of the service is changed. Additionally, the priority change condition may include a condition as to whether the average waiting time of the data of the specific service exceeds a predetermined reference value. For example, the priority of the BE2 service may be changed depending on the quantity of the data stored in the transmission buffer, or may be changed depending on the average waiting time of the data stored in the transmission buffer.

If the priority change condition is satisfied simultaneously for two or more services, the priority can be changed by sequential methods. For example, it is supposed that the user equipment transmits three types of services such as BE1, BE2 and BE3, and that the priority of BE1 is the highest and the priority of BE3 is the lowest. In this case, if the priority change conditions of BE2 and BE3 are simultaneously satisfied in a specific TTI, the priority of the service having higher priority can first be changed. For example, the priority change conditions of BE2 and BE3 are satisfied in the Nth TTI, the priority is changed in the order of BE2, BE1 and BE3 in the (N+1)th TTI. Supposing that the priority duration is 1 TTI, the priority of BE2 returns to the original priority in the Nth TTI. Also, since the priority of BE3 has been put off in the Nth TTI due to the priority change of BE2, the priority is set in the order of BE1, BE3 and BE2 in the (N+1)th TTI.

If other services satisfy the priority change condition in the (N+1)th TTI, the priority change is performed in the TTI after the (N+1)th TTI. Although the priority has been increased at one level during priority change in the aforementioned embodiments, it may be increased at several levels. For example, if the priority of BE3 has been increased at two levels, the priority may be changed from the order of BE1, BE2 and BE3 to the order of BE3, BE1, and BE2. In this case, the duration for prohibiting the priority from changing can be set so that the priority cannot be changed even though the priority change condition is satisfied for a certain time period after the changed priority duration.

When two or more services simultaneously satisfy the priority change condition, a method of simultaneously changing two services can be used as another method for priority change. For example, if the services BE2 and BE3 satisfy the aforementioned priority change condition in a specific TTI, the priority can be changed in the order of BE2, BE3 and BE1. Also, if there are provided several priority change conditions per service, the respective services may be set at different increasing levels. For example, if BE2 and BE3 satisfy the priority change condition, the quantity of the data of the BE2 service in the transmission buffer is 50, and the quantity of the data of the BE3 service is 100, the priority can be set in the order of BE3, BE2 and BE1. This method can be applied to the case where one service satisfies the priority change condition. For example, if BE2 satisfies the priority change condition and the quantity of the data of the BE3 service in the buffer is 50, the priority is increased at one level, whereby the priority is set in the order of BE1, BE3 and BE2. However, if the quantity of the data is 100, the priority is increased at two levels, whereby the priority can be set in the order of BE3, BE1, and BE2.

Referring to FIG. 4 again, the user equipment uses the changed priority if the priority is changed. If not so, the user equipment selects a specific TFC from the TFCS by using the basis priority [S44]. The procedure of selecting a specific TFC from the given TFCS in accordance with priority of logical channels or services will be described in more detail.

Figure 7:
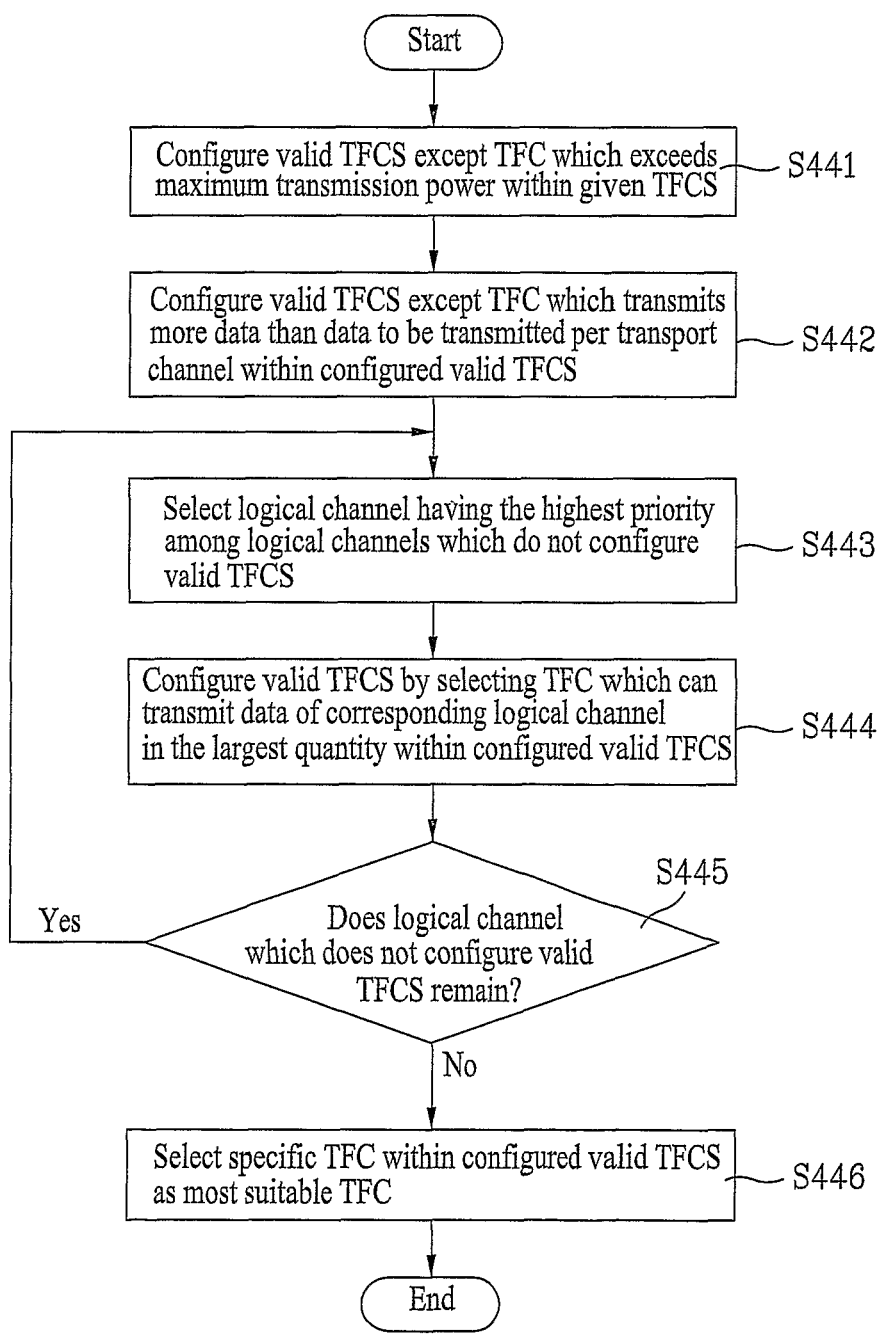
FIG. 7 to FIG. 9 illustrate procedures of selecting a specific TFC from TFCS transferred from a network in MAC layer of a user equipment in accordance with one embodiment of the present invention.
Figure 8:
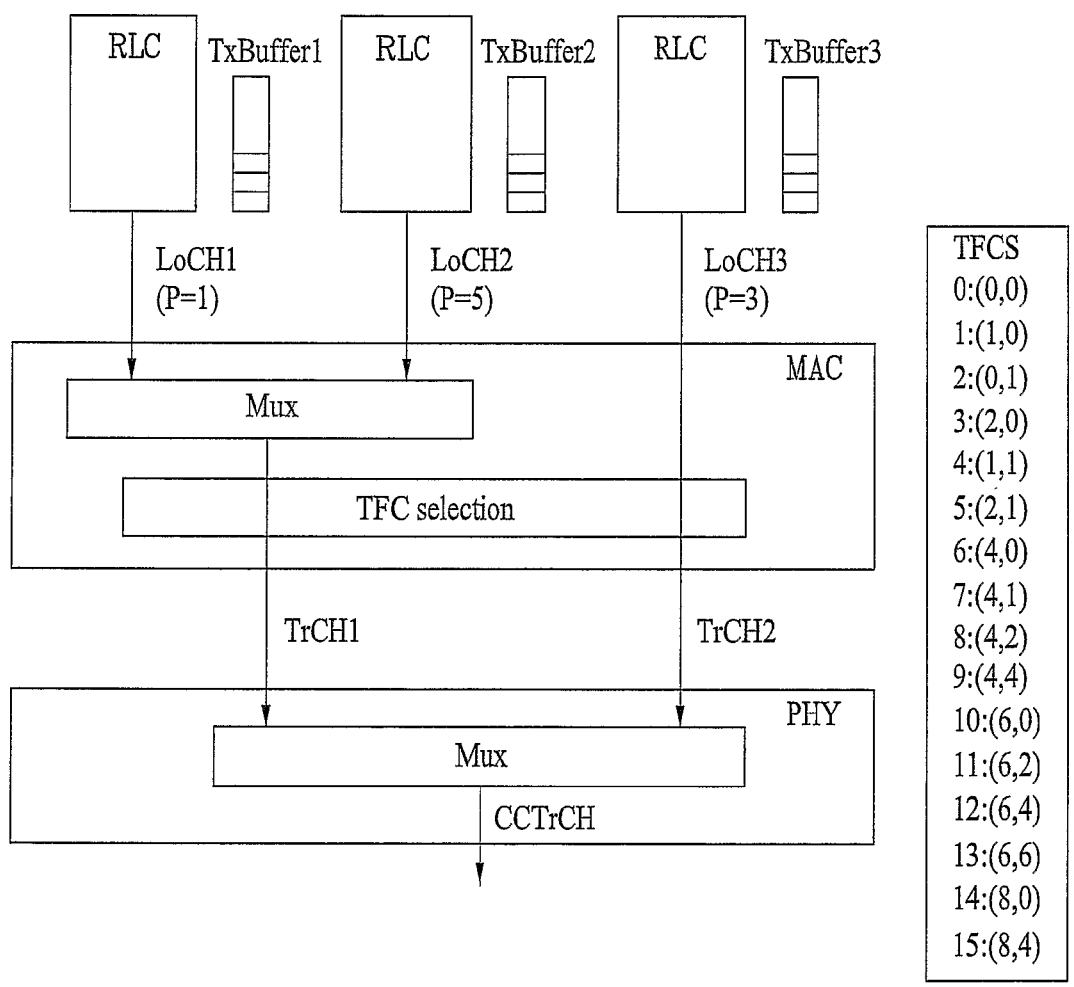
Figure 9:
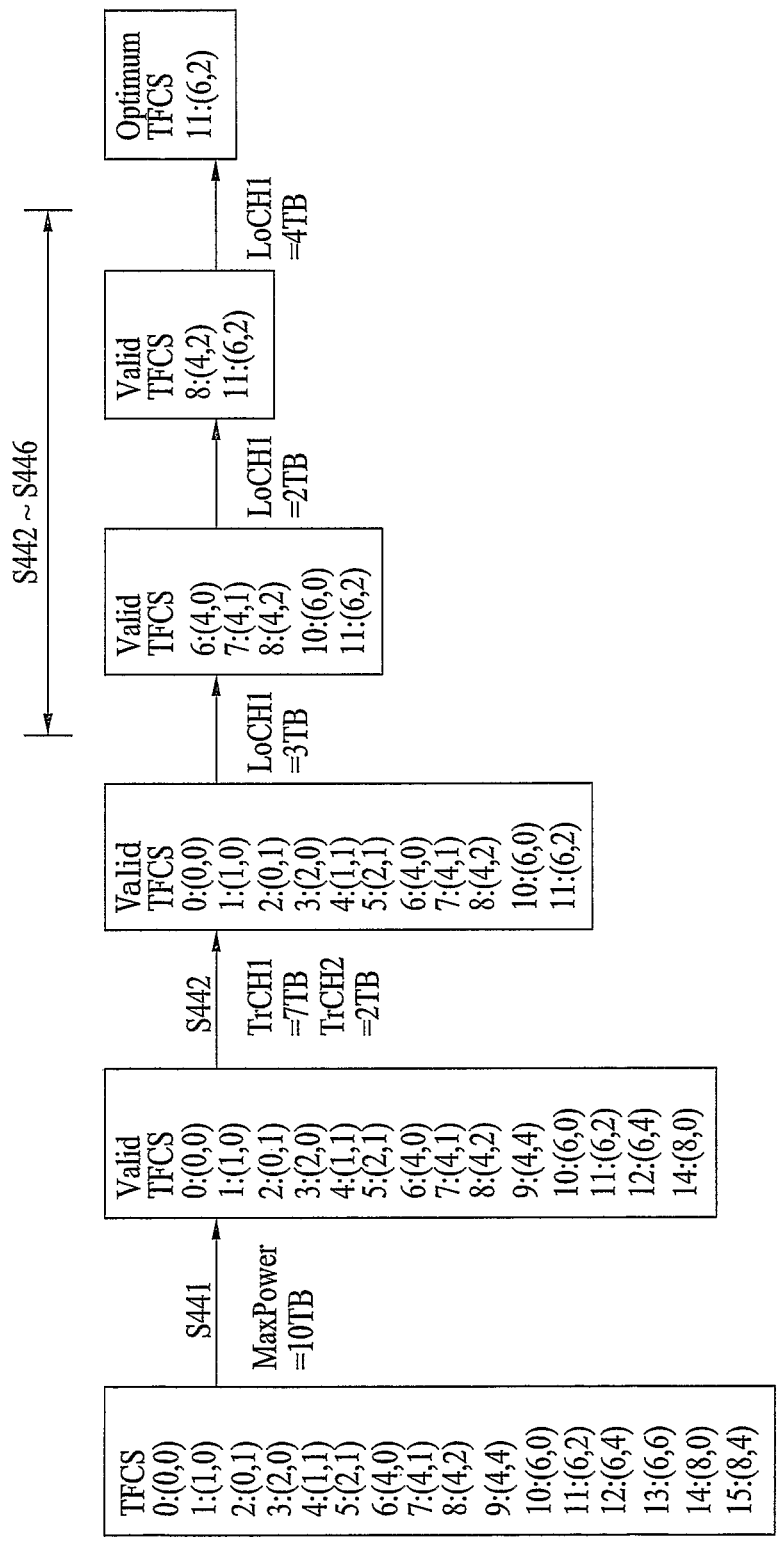

FIG. 7 to FIG. 9 illustrate procedures of selecting a specific TFC from TFCS transferred from the network in the MAC layer of the user equipment in accordance with one embodiment of the present invention. FIG. 7 is a flow chart illustrating a procedure of selecting a TFC in accordance with priority of logical channels. In FIG. 7, one CCTrCH is mapped with TrCH1 and TrCH2, which are transport channels, TrCH1 is mapped with LoCH1 and LoCH2, which are logical channels, and TrCH2 is mapped with LoCH3 which is a logical channel. In this case, it is supposed that the priority of the logical channels is as follows; LoCH1=1, LoCH2=5, and LoCH3=3, wherein the priority of LoCH1 is the highest. FIG. 9 illustrates a procedure of selecting a TFC in accordance with the procedure of FIG. 7 in an example of FIG. 8.

In FIG. 8, the MAC layer selects the most suitable TFC within TFCS given per TTI. The TFCS is as shown in a box of FIG. 8. The TFCS is not determined by the MAC layer but is transferred to the MAC layer by the RRC layer when RB is set. In the example of FIG. 8, a total of 16 TFCS are defined. Each TFC includes a TFC index (TFCI). The MAC layer indicates a TFI value related to each physical layer when transferring transport block sets to the physical layer through each transport channel. The physical layer configures TFCI by using the transferred TFI values. In TFCS of FIG. 8, numbers in parentheses originally mean the number of TBs having TrCH1 of which size is Size1 and the number of TBs having TrCH2 of which size is Size2. However, it is supposed that sizes Size1 and Size2 of all TBs are equal to each other. Accordingly, it is to be understood that the numbers in parentheses in TFCS of FIG. 8 mean the number of TBs having TrCH1 and the number of TBs having TrCH2.

As shown in FIG. 8, it is supposed that data blocks of Tx Buffer1=3, Tx Buffer2=4, Tx Buffer3=2 are waiting for transmission in transmission buffers (Tx Buffers) of RLC layers. At this time, it is supposed that a total of 10 TBs can be transmitted by limitation of the maximum transmission power.

Referring to FIG. 7 to FIG. 9, since maximum 10 TBs can be transmitted by limitation of the maximum transmission power among a total of 16 TFCS, except for TFCI=13,15 among given TFCS, valid TFCS are configured [S441].

Among TFCS configured in step S441, except TFC which transmits TBs more than a total number of TBs stored in the Tx Buffer of RLC per transport channel, valid TFCS are configured [S442]. The TFC greater than the data quantity of the transport channel is excluded because the TFC causes a waste of radio resources in that the RLC layer should generate and transmit TBs consisting of padding only without data. In the example of FIG. 8, since data of TrCH1 correspond to 7 TBs along with data of LoCH1 and LoCH2, TFCI=14 is excluded. Likewise, since data of TrCH2 correspond to 2 TBs, TFCI=9 and TFCI=12 are excluded. In this way, except TFCI=9, 12, 14, new valid TFCS are configured. The order of the steps S441 and S442 may be changed.

Since the logical channel having the highest priority is LoCH1 of P=1, new valid TFCS are configured based on LoCH1 [S443]. Since data of LoCH1 correspond to three TBs, TFCI=6~11 that can transmit data of LoCH1 at the greatest quantity are selected from valid TFCS configured in step S442 to configure new valid TFCS [S444].

Next, new valid TFCS are configured based on LoCH3 which is a logical channel having the second priority. Since data of LoCH3 correspond to two TBs, TFCI=8 and TFCI=11 that can transmit data of LoCH3 at the greatest quantity are selected from the newly configured valid TFCS to configure new valid TFCS. Next, new valid TFCS are configured based on LoCH2 which is a logical channel having the third priority. Since data of LoCH2 correspond to three TBs, TFCI=11 that can transmit data of LoCH2 at the greatest quantity are selected from the newly configured valid TFCS to configure new valid TFCS. At this time, since one TFC only exists within the valid TFCS, TFCI=11 is selected as the most suitable TFC. After all, the number of TBs transmitted in this TTI becomes LoCH1=3, LoCH2=3, and LoCH3=2 per logical channel [S443~S446].

If the TFC is selected in accordance with the priority [S44], data of each logical layer (or service) are transferred to a lower layer in accordance with the selected TFC [S45]. In the example of FIG. 8, TBs of LoCH1=3, LoCH2=3, and LoCH3=2 per logical channel are transferred to the MAC layer in accordance with TFC of TFCI=11. LoCH1 and LoCH2 are multiplexed in the MAC layer and then mapped with TrCH1, and LoCH3 is mapped with TrCH2 so that the data are transferred to the physical layer. TrCH1 and TrCH2 are multiplexed in the physical layer to configure a coded composite transport channel (CCTrCH) [S46]. The data multiplexed into CCTrCH are processed by the physical layer in accordance with a protocol and then transferred to the network through the physical channel [S47].

Figure 10:
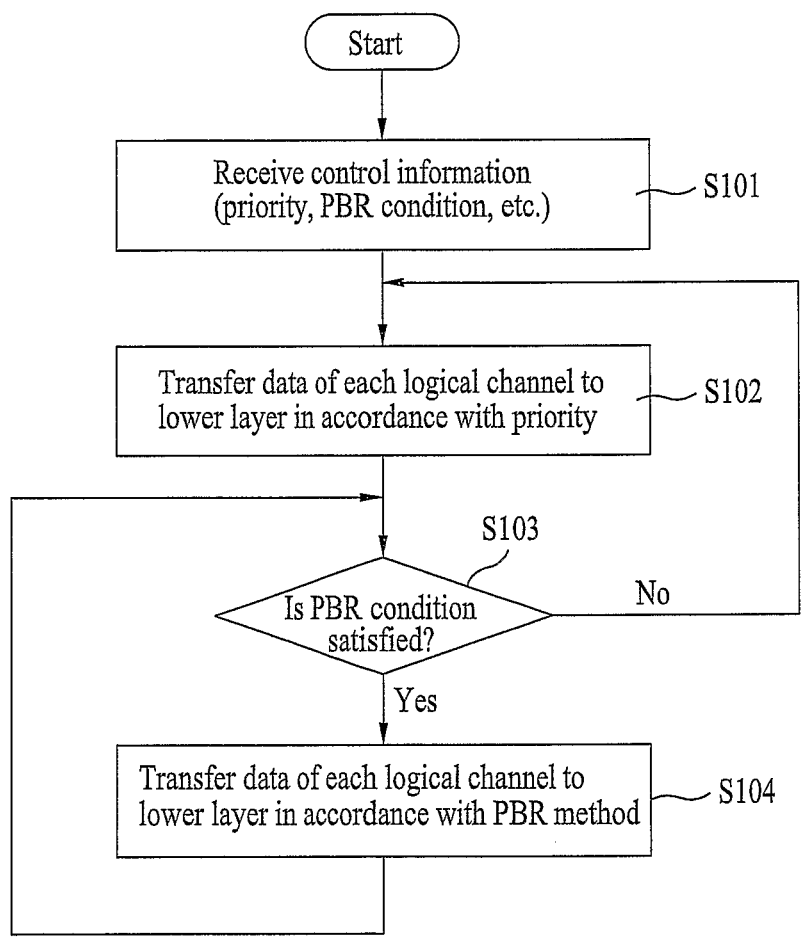
FIG. 10 is a flow chart according to another embodiment of the present invention.

FIG. 10 is a flow chart according to another embodiment of the present invention. In the embodiment of FIG. 10, technical features of the present invention are applied to a prioritized bit rate (PBR) method. The PBR method is one of methods for reducing 'starvation' if an upper layer transfers data per service or RB to a lower layer, and is to allocate lower layer resources in accordance with priority per service if there is redundancy in the lower layer resources after the lower layer resources equivalent to a previously determined quantity (PBR quantity) are first allocated to each service or RB (or logical channel).

Referring to FIG. 10, the user equipment receives control information related to the priority of logical channels from the network [S101]. The control information includes information related to the basic priority of a plurality of logical channels, at least one condition for applying the PBR method, and PBR quantity that will be applied to each logical channel when the condition is satisfied. If the network transmits system information to the user equipment, the control information can be included in the system information when it is transmitted. For another example, the control information can be transmitted to the user equipment during RRC connection establishment between the network and the user equipment, and establishment, change or reestablishment of the radio bearer (RB). The information related to the condition for applying the PBR method may not be transferred from the network to the user equipment. Namely, the user equipment can determine the information related to the condition for applying the PBR method considering its buffer status, transport resources, etc.

The user equipment transfers the data stored in the buffer of each logical channel to the lower layer by using the basic priority included in the received control information [S102]. At this time, as described above, the user equipment multiplexes data of each logical channel by using the TFCS and transfers the multiplexed data to the physical layer through the MAC layer.

The user equipment determines whether at least one condition for applying the PBR method included in the received control information is satisfied [S103]. If the at least one condition is satisfied, the user equipment transfers the data stored in the buffer of each logical channel to the lower layer by using the PBR method [S104]. If the at least one condition is not satisfied, the user equipment transfers the data stored in the buffer of each logical channel to the lower layer in accordance with the basic priority [S102].

The at least one condition for applying the PBR method can be determined depending on the status of the buffer of each logical channel and/or the status of the lower layer resources. For example, whether the quantity of data stored in a buffer of a random logical channel exceeds a predetermined threshold value or whether an average waiting time of the data stored in the buffer of the random logical channel exceeds a predetermined reference value can be included in the at least one condition for applying the PBR method.

Figure 11:
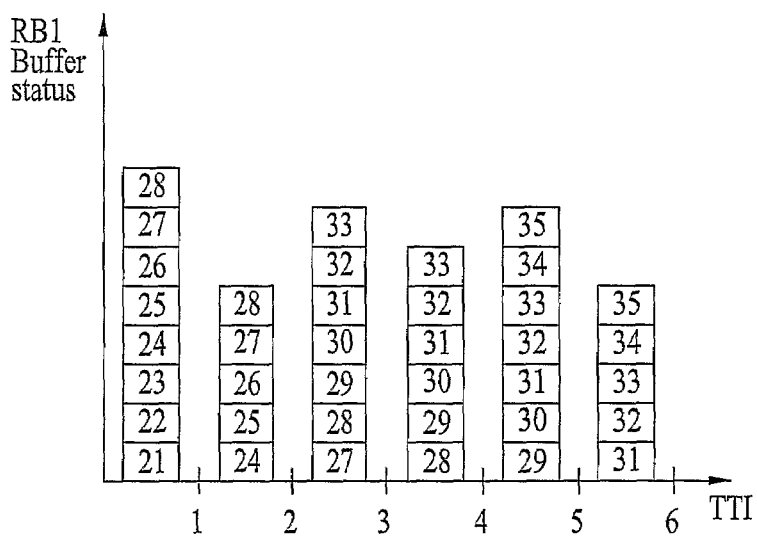
FIG. 11 illustrates a detailed operation of FIG. 10.
Figure 11:
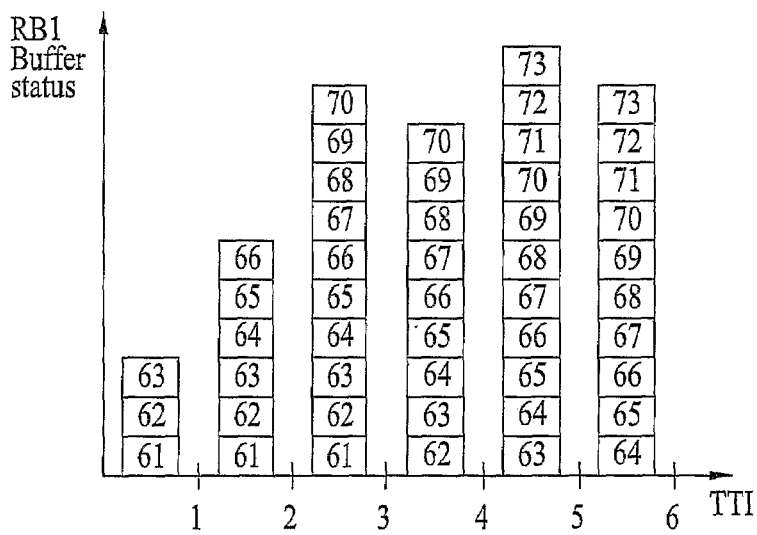

FIG. 11 illustrates the detailed operation of the embodiment of FIG. 10. In FIG. 11, (a) represents the buffer status per TTI in RB1 buffer which stores data for a first service, and (b) represents the buffer status per TTI in RB2 buffer which stores data for a second service. Also, (c) illustrates data blocks transferred to the lower layer per TTI. In FIG. 11, it is supposed that the priority of the first service is higher than that of the second service and a PBR of each service is one block per TTI (1 block/TTI). The condition for applying the PBR method relates to whether ten or more data blocks are stored in the RB2 buffer which stores the data of the second service having the lower priority. The PBR method is applied if ten or more data blocks are stored in the RB2 buffer. Also, the PBR method is applied for 2 TTI if the condition for applying the PBR method is satisfied.

Since the number of data blocks stored in the RB2 buffer is smaller than 10 in the first TTI, the PBR method is not applied. Accordingly, available lower layer resources are all allocated to the first service having the higher priority so that three data blocks 21, 22 and 23 stored in the RB1 buffer are transferred to the lower layer. Since the PBR method is not applied in the second TTI too, available lower layer resources are all allocated to the first service so that three data blocks 24, 25 and 26 stored in the RB1 buffer are transferred to the lower layer.

Since the number of data blocks stored in the RB2 buffer is 10 in the third TTI, the PBR method is applied. Accordingly, resources equivalent to the PBR set per service are first allocated. Since the set PBR is 1 block/TTI for both the first service and the second service, one data block of the RB1 buffer and one data block of the RB2 buffer are first transferred to the lower layer. Since the number of data blocks that can be transferred to the lower layer in the third TTI is 2, additional transfer of the data blocks does not occur. Even in case that the PBR method is applied, the lower layer resources can first be allocated to the service having the higher priority in accordance with the priority per service. Reversely, the lower layer resources can first be allocated to the service having the lower priority. In FIG. 11, if the condition for applying the PBR method is satisfied, the PBR method is applied for 2 TTI. Accordingly, the data blocks are transferred to the lower layer in the fourth TTI in the same manner as the third TTI.

Since the number of data blocks stored in the RB2 buffer is 11 in the fifth TTI, the PBR method is applied. Accordingly, one data block in each buffer is first transferred to the lower layer, and redundant lower layer resources are allocated to the service having the higher priority in accordance with the priority. Since there is redundancy corresponding to one data block, one data block of the first service having the higher priority is additionally transferred to the lower layer. Likewise, the PBR method is applied in the sixth TTI, so that data blocks stored in each buffer are transferred to the lower layer in the same manner as the fifth TTI.

In the example of FIG. 11, although the PBRs of the respective services have been set equally, they may be set differently per service. Also, the PBR of each service may variably be determined depending on the buffer status of the user equipment and/or the lower layer resources. In the example of FIG. 11, although the PBR method of 1 block/TTI has been applied to each service if ten or more data blocks are stored in the RB2 buffer, the PBR method may be applied in such a manner that the PBR for the first service is set to 1 block/TTI and the PBR for the second service is set to 2 blocks/TTI if twenty or more data blocks are stored in the RB2 buffer.

According to the present invention, a waste of radio resources can be avoided in the wireless communication system and the radio resources can be used efficiently.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the user equipment and the network. A specific operation which has been described herein as being performed by the network may be performed by a base station or an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the random access method in the mobile communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving paging messages in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific foil is without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a wireless communication system such as a mobile communication system or a wireless Internet system.

The invention claimed is:

1. A method of transferring data in a user equipment of a wireless communication system to multiplex a plurality of logical channels and map the multiplexed logical channels with a lower layer channel, the method comprising:

receiving, by the user equipment from a network, control information related to priorities of the plurality of logical channels that convey information between a radio link control (RLC) layer and a medium access control (MAC) layer of the user equipment, the control information including information about a basic priority for each of the plurality of logical channels, at least one condition for changing the basic priority, a method for changing the basic priority when the at least one condition is satisfied, a first time period during which the changed priority is effective, and a second time period during which a change of the basic priority is prohibited after the first time period elapses;

determining, by the user equipment, whether the at least one condition in the user equipment is satisfied, wherein the at least one condition includes the quantity of data stored in a transmission buffer associated with a logical channel in the user equipment exceeding a predetermined threshold value, and wherein the first time period and the second time period are configured to be variable in accordance with the quantity of data stored in the transmission buffer exceeding the predetermined threshold value;

changing, by the user equipment, the basic priority of the logical channel in accordance with the method for changing the basic priority if the quantity of data stored in the transmission buffer of the logical channel exceeds the predetermined threshold value; and selecting, by the user equipment, a specific transport format combination (TFC) from a specific transport format combination set (TFCS) in accordance with the changed priority; and transferring, by the user equipment, data of each of the plurality of the logical channels to the lower layer in accordance with the selected TFC, wherein the changed priority is maintained for the first time period and the changed priority is restored to the basic priority after the first time period, and wherein the change of the basic priority is prohibited for the second time period after the first time period elapses.

2. The method of claim 1, wherein the at least one condition includes a condition as to whether an average waiting time of data stored in a buffer of a logical channel exceeds a predetermined reference value.

3. The method of claim 2, wherein the priority of the logical channel is increased if the average waiting time of data stored in the buffer of the logical channel exceeds the predetermined reference value.

* * * * *